(12) United States Patent
Aubin et al.

(10) Patent No.: US 10,203,730 B2
(45) Date of Patent: Feb. 12, 2019

(54) METHOD FOR OBTAINING AN ELECTRONIC DEVICE HOUSING PANEL AND CORRESPONDING HOUSING, DEVICE AND APPARATUS

(71) Applicant: THOMSON LICENSING, Issy les Moulineaux (FR)

(72) Inventors: Anthony Aubin, Bourgbarre (FR); Jean-Marc Le Foulgoc, Bourgbarre (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/510,511

(22) PCT Filed: Sep. 7, 2015

(86) PCT No.: PCT/EP2015/070356
§ 371 (c)(1),
(2) Date: Mar. 10, 2017

(87) PCT Pub. No.: WO2016/037967
PCT Pub. Date: Mar. 17, 2016

(65) Prior Publication Data
US 2017/0285690 A1    Oct. 5, 2017

(30) Foreign Application Priority Data

Sep. 12, 2014   (FR) .................................... 14 58602

(51) Int. Cl.
*H05K 5/00* (2006.01)
*G06F 1/16* (2006.01)

(52) U.S. Cl.
CPC .......... *G06F 1/1656* (2013.01); *G06F 1/1601* (2013.01); *G06F 1/1637* (2013.01)

(58) Field of Classification Search
CPC ....................................................... B06R 1/02
(Continued)

(56) References Cited

U.S. PATENT DOCUMENTS 8,031,202 B2   10/2011   Perronnin
8,553,045 B2   10/2013   Skaff et al.
(Continued)

OTHER PUBLICATIONS

Urban et al., "Color Correction by Considering the Distribution of Metamers within the Mismatch Gamut", Fifteenth IS&T/SID Color Imaging Conference, Albuquerque, New Mexico, 2007, pp. 222-227.
(Continued)

*Primary Examiner* — Jerry Wu
(74) *Attorney, Agent, or Firm* — Brian J. Dorini; Patricia A. Verlangieri (57) ABSTRACT

The present disclosure relates to a method for obtaining a face of a housing to be mounted, in a mounting position, on the body of an electronic device, the housing includes a panel designed to cover, in the mounting position, a portion of a display screen of the device to be illuminated. In some embodiments of the present disclosure, a method describes molding of the panel from a first mixture of a base material and a concealing material, the first mixture meeting a first transparency criterion, defined based on an optical parameter value, so as to make it possible, in the mounting position, to conceal the screen portion, by the panel, in the absence of lighting from the screen and to make the screen visible when it is illuminated, through the panel.

19 Claims, 4 Drawing Sheets

(58) Field of Classification Search
USPC .................................................. 361/679.21
See application file for complete search history.

(56) References Cited

U.S. PATENT DOCUMENTS

| | | | |
|---|---|---|---|
| 2005/0007645 A1* | 1/2005 | Tonar ................ | B60Q 1/2665 359/265 |
| 2008/0015934 A1 | 1/2008 | Kim et al. | |
| 2009/0040790 A1 | 2/2009 | Payne | |
| 2011/0168590 A1 | 7/2011 | Kotanen et al. | |
| 2013/0163856 A1 | 6/2013 | Sohn et al. | |
| 2014/0233167 A1* | 8/2014 | Rayner ................ | H01H 13/06 361/679.3 |

OTHER PUBLICATIONS

Men et al., "Color Point Cloud Registration with 4D ICP Algorithm", 2011 IEEE International Conference on Robotics and Automation, Shanghai, China, May 9, 2011, pp. 1511-1516.

Pouli et al., "Progressive color transfer for images of arbitrary dynamic range", Computers & Graphics, vol. 35, No. 1, Feb. 2011, pp, 67-80.

Pitie et al., "Automated colour grading using colour distribution transfer", Computer Vision and Image Understanding, vol. 107, No. 1-2, Jul./Aug. 2007, pp. 123-137.

Druon et al., "Color Constrained ICP for Registration of Large Unstructured 3D/color Data Sets", 2006 International Conference on Information Acquisition, Shandong, China, Aug. 20, 2006, pp. 249-255.

Men et al., "Hue-assisted automatic registration of color point clouds", Journal of Computational Design and Engineering, vol. 1, No. 4 (2014), pp. 223-232.

Yang et al., "Automatic Mood-Transferring between Color Images", IEEE Computer Graphics and Applications, Mar./Apr. 2008, pp. 52-61.

Xiao et al., "Color transfer in correlated color space", ACM International Conference on Virtual Reality Continuum and Its Applications, Hong Kong, Jun. 14, 2006, pp. 305-309.

* cited by examiner

METHOD FOR OBTAINING AN ELECTRONIC DEVICE HOUSING PANEL AND CORRESPONDING HOUSING, DEVICE AND APPARATUS

This application claims the benefit, under 35 U.S.C. § 365 of International Application PCT/EP2015/070356, filed 7 Sep. 2015, which was published in accordance with PCT Article 21(2) on 17 Mar. 2016, in English, and which claims the benefit of French Patent Application No. 1458602 filed 12 Sep. 2014.

1. FIELD

The field of the present disclosure is that of electronic or electrical devices and more specifically electronic or electrical devices equipped with a display.

2. PRIOR ART

Electronic and electrical devices are becoming increasingly more prevalent in daily life. As such, they are often equipped with a user-friendly interface. This interface often includes a display screen.

The appearance of the electronic device is often a major challenge for a manufacturer. In fact, the equipment's features are often not visible on the device. The appearance of the device is therefore usually the only way for an uninformed user to evaluate the technical nature of their device. The "modern" and "high tech" character of the casing of a device is therefore critical for a manufacturer of electronic devices.

The people responsible for developing specifications regarding the appearance of a device (or "designers") therefore play a key role in the manufacture of an electronic device. When the device is equipped with a display screen, designers often fault the screen for being too visible on the apparatus when not in use. One of their frequent requirements, with regard to their suppliers, particularly equipment manufacturers in charge of making casings for devices, is to make the display and its window less visible.

Some solutions from the prior art, such as the one presented by patent document U.S. Pat. No. 7,755,827, sought to meet this requirement by incorporating, into an electronic device equipped with a screen, a configurable transparent plate, arranged in front of the screen, along with a control module for adjusting this transparency. Such solutions, however, require a highly complex implementation and significantly increase the cost of making the device.

There is therefore a need for a simple, and possibly more effective, solution in terms of hiding the screen, than the solutions of the prior art.

3. SUMMARY

The present disclosure makes it possible to improve the situation by proposing a method for obtaining an electronic device housing that is more effective than the solutions of the prior art, at least according to some embodiments.

More specifically, the present disclosure relates to a method for obtaining at least one panel of a housing to be mounted, in at least one mounting position, on a body of an electronic device, said panel (or "window", "bezel" or "front panel") being intended to cover, in said mounting position, at least one portion, intended to be illuminated, of a display screen of said electronic device. The panel can be comprised in a face of said housing.

According to at least one embodiment, said obtaining method comprises a step consisting of moulding said panel from a first mixture of at least one base material and at least one opacifying material, said first mixture meeting at least one first transparency criterion, for example a first transparency criterion defined based on at least one optical parameter value, said first mixture being adapted so that said panel conceals said screen portion, in said mounting position, in the absence of lighting from said screen, and leaves said screen portion visible through said panel, when said screen portion is illuminated.

The first transparency criterion can for example be defined based on at least one optical parameter value, such as a degree of transparency, a degree of translucence or a brightness level.

According to at least one embodiment, the obtaining method further comprises a step consisting of overmoulding said panel with a concealing element moulded from a second mixture comprising at least one second base material and at least one second opacifying material, said second mixture being adapted so that said concealing element meets at least a second transparency criterion, defined for example based on at least one optical parameter value, and at least partially conceals, in said mounting position, a component of said device.

According to at least one embodiment, the surface of the panel comprises:
  an outer surface forming a portion of an outer surface of
    a face of said housing in said mounting position;
  at least one junction surface with said concealing element;
  at least one inner surface to face, in said mounting
    position, said portion to be illuminated on said screen;
and at least one portion of said junction surface and/or said inner surface is parallel to at least one part of said outer surface.

According to a particular characteristic, said junction surface comprises a first junction area located opposite a periphery of said outer surface of said panel. For example, the concealing element can have a diameter and/or length and an outer width similar to those of the panel.

According to a particular characteristic, said panel occupies an entire outer surface of said face.

The phrase "entire outer surface" means that it takes up at least 95% (for example 95%, 98% or 100%) of the outer surface, to account for manufacturing tolerances. In some embodiments, the panel can also at least partially occupy the outer surface of at least one other face of said housing.

According to a particular characteristic, said outer surface of said face has at least one rounded end.

According to a particular characteristic, at least one junction of said panel with said concealing element forms an acute and/or obtuse angle with said outer surface and/or said inner surface.

According to at least one embodiment, the obtaining method comprises a step consisting of creating at least one positioning module for positioning at least one visual element in a part of said concealing element in contact with a junction surface of said panel and/or in a portion of said outer surface of said panel opposite said junction surface.

According to a particular characteristic, creating said positioning module is implemented during the steps consisting of moulding said panel and/or said concealing element.

According to a particular characteristic, creating said positioning module comprises forming a through hole in said panel and/or said concealing element.

Although not explicitly described, the embodiments presented can be implemented using any combination or subcombination. For example, an embodiment in which the obtaining method comprises a moulding of a panel and a concealing element can be combined with an embodiment comprising the creating of a module for positioning a visual element.

Other embodiments, easily conceivable by those skilled in the art on reading the present description, are also included within the scope of the present disclosure.

According to another aspect, the present disclosure involves a housing to be mounted, in a mounting position, on a body of an electronic device, said housing comprising at least one panel designed to cover, in said mounting position, at least one portion, intended to be illuminated, of a display screen of said electronic device.

According to a particular embodiment, said panel is moulded from a first mixture of at least one base material and at least one opacifying material, said panel meeting at least one first transparency criterion, for example a first transparency criterion defined for example based on at least one optical parameter value, and being adapted to conceal said screen portion, in said mounting position, in the absence of lighting from said screen, and leave, in said mounting position, said screen portion visible, through said panel when said screen portion is illuminated.

According to a particular embodiment, said panel is overmoulded with a concealing element moulded from a second mixture comprising at least one second base material and at least one second opacifying material, said second mixture being adapted so that said concealing element meets at least one second transparency criterion, for instance a second transparency criterion defined based on at least one optical parameter value, and said concealing element is adapted to at least partially conceal, in said mounting position, a component of said device.

According to a particular embodiment, said first transparency criterion and/or said second transparency criterion is defined based on at least one optical parameter value.

According to a particular embodiment, said optical parameter belongs to a group of parameters comprising:
 a degree of transparency,
 a degree of translucence,
 a brightness level;
 a combination of at least two of said parameters.

According to a particular embodiment, the surface of the panel comprises:
 an outer surface forming a portion of an outer surface of a face of said housing in said mounting position;
 at least one junction surface with said concealing element;
 at least one inner surface to face, in said mounting position, said portion to be illuminated on said screen.
and at least one portion of said junction surface and/or said inner surface is parallel to at least one part of said outer surface.

According to a particular embodiment, at least one junction surface of said panel with said concealing element forms an acute and/or obtuse angle with said outer surface and/or said inner surface of said panel.

According to a particular embodiment, said junction surface comprises a first junction area located opposite a periphery of said outer surface of said panel.

According to a particular embodiment, said panel occupies an entire outer surface of said face.

According to a particular embodiment, said outer surface of said face has at least one rounded end.

According to a particular characteristic, said concealing element comprises a surface consisting of the outer surface of at least one face of said housing adjacent to said face to be positioned, in said mounting position, in front of said portion of said display screen. Although not explicitly described, said housing can comprise, in some of its embodiments, all or some of the characteristics described above, with regard to the obtaining method in the present disclosure.

According to yet another aspect, the present disclosure relates to an electronic device equipped with a housing according to one of the aforementioned embodiments.

In particular, the present disclosure relates to an electronic device comprising:
 a light source;
 a body on which is mounted, in a mounting position, a housing, said housing comprising at least one panel to cover, in said mounting position, at least one portion of a display screen of said electronic device to be illuminated by said light source, According to at least one embodiment, said panel is moulded from a first mixture of at least one base material and at least one opacifying material, said panel meeting at least one first transparency criterion, and being adapted to conceal in said mounting position said screen portion, in the absence of lighting from said screen and to leave, in said mounting position, said screen portion visible, through said panel, when said screen portion is illuminated.

According to the embodiments, the light source can be internal or external to the screen. Such an electronic device can notably be a gateway for accessing a broadband communication network, a decoder (set top box), or a computer, for example a personal computer (PC), and on-board computer, a desktop computer, a computer server, a telephone, video processing devices, sound devices, or lighting devices, this list being non-exhaustive.

According to yet another aspect, the present disclosure relates to an apparatus comprising an electronic device equipped with a housing according to one of the aforementioned embodiments.

In particular, the present disclosure relates to an apparatus comprising an electronic device comprising a body on which is mounted, in a mounting position, a housing, said housing comprising at least one panel designed to cover, in said mounting position, at least one portion of a display screen of said electronic device to be illuminated. Said panel can be part of a face of said housing.

According to at least one embodiment, said panel is moulded from a first mixture of at least one base material and at least one opacifying material, said panel meeting at least one first transparency criterion, and being adapted to conceal said screen portion in said mounting position, in the absence of lighting from said screen and to leave, in said mounting position, said screen portion visible, through said panel, when said screen portion is illuminated.

Such an apparatus can notably be an apparatus, for example a vehicle, equipped with an on-board computer with a housing according to any one of the aforementioned embodiments.

4. LIST OF FIGURES

The present disclosure will be better understood, and other specific features and advantages will emerge upon reading the following detailed description, relating to a particular embodiment, the description making reference to the annexed drawings wherein.

A same element is designated in all the figures by the same reference symbol.

The figures shown are for illustrative purposes only and in no case limit the present disclosure to the embodiments shown.

5. DESCRIPTION OF EMBODIMENTS OF THE PRESENT DISCLOSURE

Figure 1:
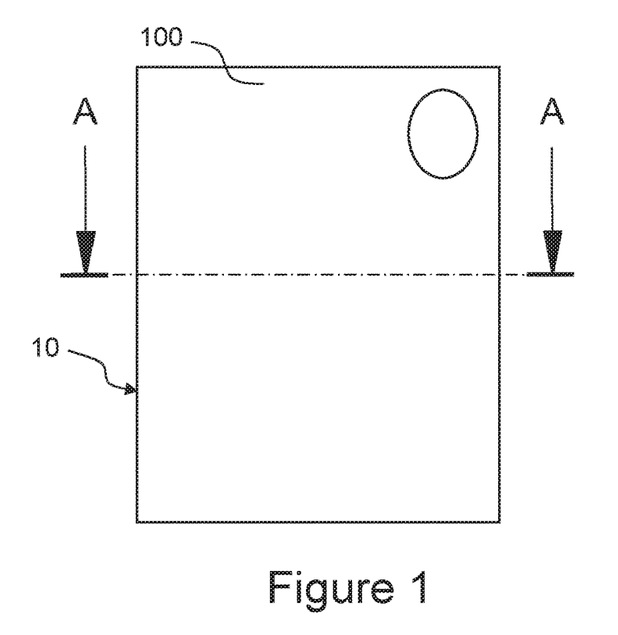
FIG. 1 shows a view of a panel comprised in a front face of an electronic device housing, designed to be positioned in a mounting position in front of a display screen of the electronic device, according to a particular embodiment of the present disclosure.

The general principle of the present disclosure is offered in relation to FIG. 1. The principle of the present disclosure consists of proposing a panel, for instance as illustrated by FIG. 1 a panel 100 comprised in a face 10 of a housing intended to equip an electronic device having a display screen, making it possible, in some embodiments, to hide the screen when it is not illuminated and to allow it to be visible when it is illuminated. For the purposes of simplification, this face is also called a "front" face in the present disclosure. In the embodiment shown, the screen is a transmitive screen and it is illuminated by means of a light source inside the electronic device, for example a light source located on the a face of the screen opposite or lateral to the one intended to be visible when the light source is illuminated (or "backlight"), or by other light sources, for instance OLED (Organic Light-Emitting Diode) source. According to the embodiments, the light source can be internal or external to the screen.

Unlike some solutions of the prior art, which propose the use of a panel with variable transparency, this is obtained according to the disclosure, by an appropriate choice of transparency in the materials of the panel 100 during its manufacture, the transparency of the panel once manufactured no longer being changed. In the illustrated embodiment, the panel is obtained by moulding, which makes it possible to be able to adjust the transparency of the panel, depending on the provision of the materials, so as to obtain the desired effects once the housing is mounted on the device to be housed.

The term "housing" in the present disclosure means a casing meant to contain an electronic device, notably a separate (or "standalone" device), for example to place, or a panel, intended to equip an electronic device, notably a built-in device, for example a device in a dashboard of a vehicle.

The obtaining method of the present disclosure is now presented in more detail in relation to FIGS. 1 to 5.

Figure 5:
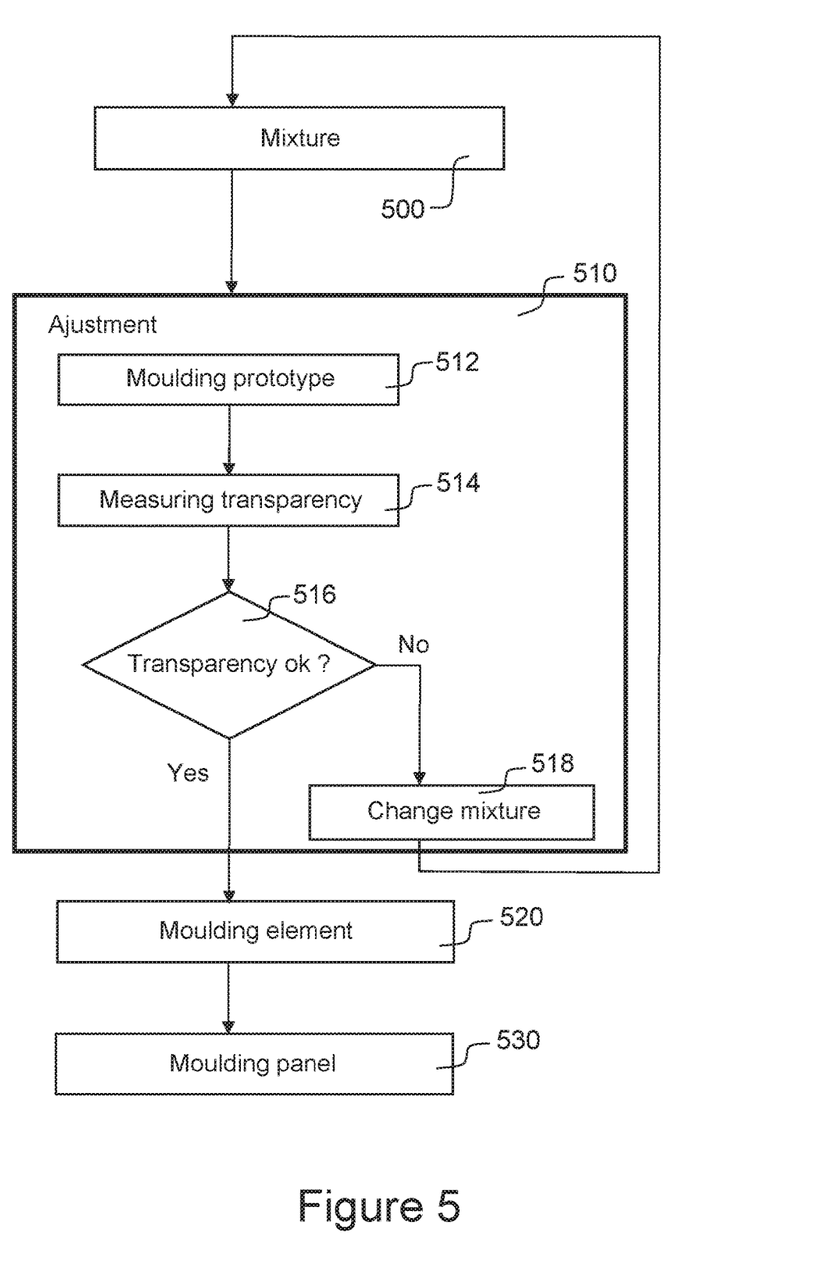
FIG. 5 shows a functional diagram of a particular embodiment of the obtaining method according to the present disclosure.

In the particular embodiment illustrated in FIG. 5, the method for obtaining the face illustrated in FIG. 1 comprises a moulding 520, 530 by bi-injection of a panel 100 and a concealing element. Both mouldings are made for example by the same set of tools equipped with two moulds. The panel is intended to be positioned, in the mounting position of the face, in front of a screen portion, and the concealing element is intended to hide, in the mounting position, at least a part of the device to which the screen belongs, and notably, in the illustrated embodiment, the perimeter of the screen.

In other embodiments, the moulding of the panel and the element can be made not by bi-injection but by insertion, for example by moulding the panel with a concealing element already moulded and inserted into the mould of the panel.

In the embodiment of FIG. 5, the method comprises a mixture 500 of at least a base material (for example a polycarbonate), which can be presented in various forms (such as a liquid, gel, powder, or granules), and an opacifying material (for example a pigment or a polycarbonate), which also can be presented in various forms (such as a liquid, gel, powder, or granules). Such an embodiment makes it possible to obtain a panel of a one-layer single block.

The base material of the panel and/or the concealing element can notably be selected from among the materials allowing, at least partially, the passage of infrared light and/or more generally radio frequencies, so as to give the housing good permeability of radio frequencies, so as not to alter the performance of an antenna. Such embodiments can therefore be sometimes better adapted to the use of an antenna than traditional solutions involving an assembly of various metallised layers. At least some embodiments allow for a less costly implementation, compared to existing solutions, and can therefore be well adapted to a mass production of housings.

In some embodiments, the base material of the concealing element is a light-shielding material.

In other, possibly compatible, embodiments, the base material of the concealing element is a material that is shock-resistant, notably after falls.

According to embodiments of the present disclosure, the base materials and/or opacifying materials used for the panel and/or the concealing element can be the same or different. Particularly, in some embodiments, only the proportions used for the mixtures of materials in the panel and/or the concealing element can be different.

The use of identical base materials can make it possible, in some embodiments, to more easily meet certain environmental requirements, such as the requirements relating to the recycling of the housing, by nullifying for example the requirements relating to the separability of different materials.

In the embodiment of FIG. 5, the method comprises an adjustment 510, prior to the mixture, of the proportions of materials to be used to mould the panel and/or the concealing element. In the particular embodiment illustrated in FIG. 5, the adjustment 510 comprises a moulding 512 of at least a prototype of the panel and/or the concealing element, from defined proportions and a measurement 514 of at least one optical parameter of the prototype, in order to verify that a transparency criterion has been met.

According to the embodiments, the prototype can be made with the same set of tools as the set of tools used for at least one of the mouldings, or with a different set of tools.

The first and second transparency criteria to be met for the panel and/or for the concealing element can depend on the embodiments.

In the illustrated embodiment, the optical parameter to be measured is a degree of transparency. The degree of transparency of an object can be defined for example by the percentage of a light beam, of a defined intensity, passing through the panel from a light source positioned in front of or behind the object. Thus, if the light beam passes through the object completely, the degree of transparency will be 100%, and an object fully preventing the light from passing through will have a zero degree of transparency.

According to a particular characteristic, a first transparency criterion to be met for the panel can be for example a particular value as the degree of transparency of the panel after moulding (for example 17%, 20%, 25% or 27%), with a degree of tolerance (for example 0.5%, 1%, 1.5%, 2%), or a value as the degree of transparency belonging to a particular interval (for example between 12 and 35%).

A second transparency criterion to be met for the concealing element can be a degree of transparency of the concealing element within a particular interval (notably a value between 5 and 15%) or a particular value as the degree of transparency of the concealing element (for example 5%, 10% or 12%). Such a degree of transparency can notably allow, in some embodiments, in the mounting position, a concealment of at least a part of the device even when the screen is illuminated. Thus, the inside of the device can be hidden, at least partially by sight, and a light beam can pass through part of the concealing element.

The measurement can for example be done with a measuring apparatus such as a spectrometer or colorimeter, from the light source of the measuring apparatus or from a baseline (or reference) light source (for example a perfect white).

Different criteria can be defined according to notably the measurement conditions and/or lighting characteristics of the screen of the device for which the housing is intended or the conditions for using the device (for example based on whether the equipment is intended for use outdoors, in bright light, or indoors).

The previous adjustment 510 can also comprise a test 516 of whether at least one transparency criterion has been met, and when at least one transparency criterion has not been met, a change 518 to the relevant mixture (for example a change to the proportions of the materials and/or a replacement of at least one of the materials, for example a replacement of the opacifying material with an opacifying material of a different shade or density). The adjustment 510 can be repeated several times, until the tested transparency criterion is satisfied.

Depending on the embodiments, the moulding 520 of said concealing element can be carried out before or after the moulding 530 of said panel. In particular, the chronological order can be defined based on the size of the panel relative to that of the face. In the embodiment illustrated in FIG. 5, the moulding 520 of the concealing element is done before the moulding 530 of the panel.

The method can also comprise a measurement (not shown) of at least one optical parameter of the panel and/or the concealing element once moulded.

The manufacture of the face will now be detailed with respect to FIGS. 1 to 4C. Such details can for example be obtained by defining an appropriate mould during the moulding of the panel and/or the concealing element, as will clearly been seen by those skilled in the art (for example working in the field of industrial moulding) when reading the present description. The term "outer surface" of the panel (and respectively of the concealing element) means the surface of the panel (and respectively of the concealing element) belonging to the surface of the face, visible once the housing is positioned on a device. The term "inner surface" of the panel (and respectively of the concealing element) refers to the surface of the panel (and respectively of the concealing element) belonging to the inner surface of the face, not visible once the housing is positioned on a device.

Figure 2:
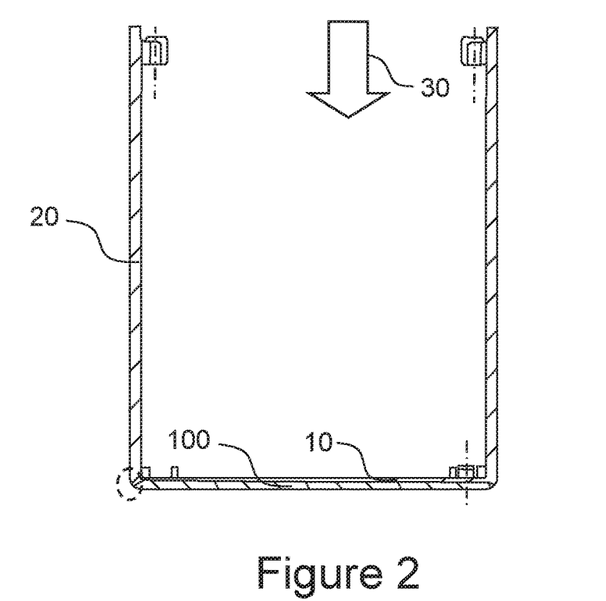
FIG. 2 shows a cross-section view of a housing compatible with the housing of FIG. 1.

FIG. 2 shows a cross-section view of a housing 20 comprising a front face 10 such as the face 10 illustrated in FIG. 1. The arrow 30 indicates the direction in which a device (not shown) is inserted into the housing.

Figure 3A:
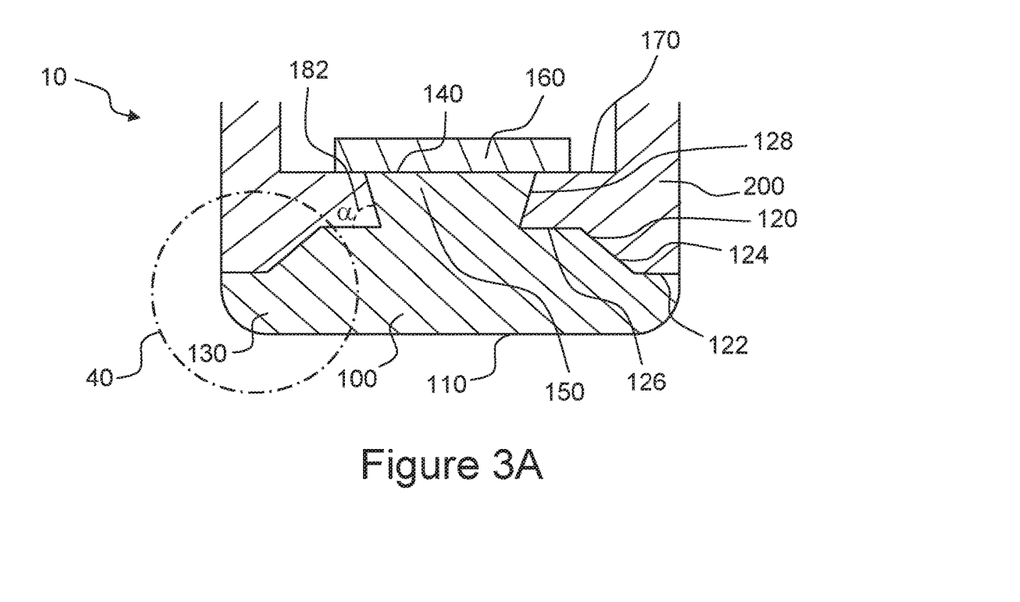
FIG. 3A shows a diagrammatic cross-section view of the front face of the housing, in the cross-section of FIG. 2.
Figure 3B:
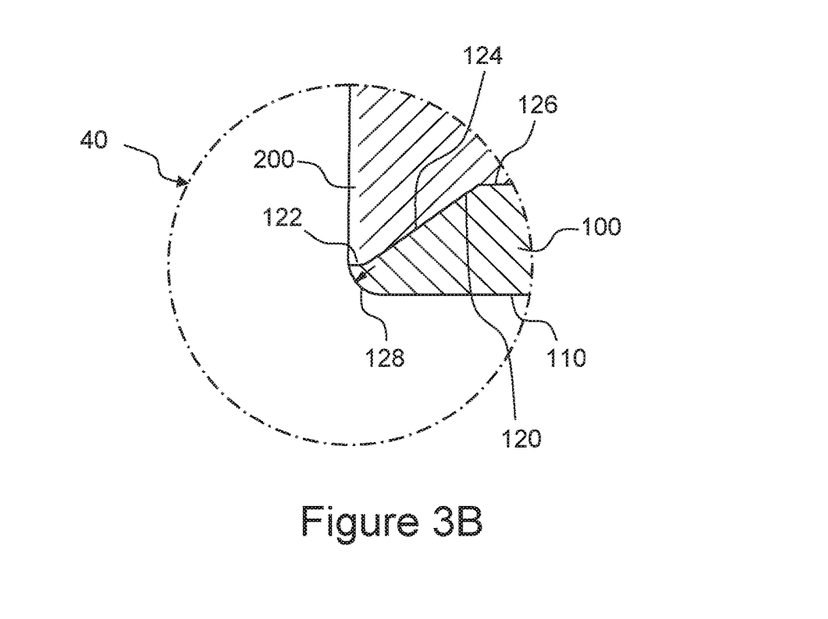
FIG. 3B shows details regarding a corner of the housing, in the cross-section view of FIG. 2 and FIG. 3A.

FIG. 3A shows a more detailed diagrammatic view of the front face, based on the cross-section view of FIG. 2, more distinctly showing the elements that comprise the front face.

In the particular embodiment illustrated, the panel 100 comprises an outer surface 110 that occupies the entire surface located on the exterior of the face 10 when it is mounted, in a mounting position, on a device. As a result, the concealing element 200 is not apparent from the outer surface of the face 10. Such an embodiment can make it possible to prevent the presence of a demarcation line on the outer surface of the face.

As illustrated, the panel 100 also comprises a junction surface 120 with the concealing element 200 and an inner surface 140 intended to face, in the mounting position, the portion 160 of a screen to be illuminated.

The mouldings 520, 530 of the panel and the concealing element are made so as to define outer and inner surface of the panel that are, at least when vertical, or nearly vertical, with the portion of the screen, parallel to one another and/or to the screen portion itself. In fact, the parallelism of the inner and outer surface of the panel in the vicinity of the screen portion can make it possible, in some embodiments, to obtain a nearly uniform thickness in the panel, and therefore a uniformity in the degree of transparency, in the vicinity of the portion of the screen in the mounting position. A positioning of the screen parallel to the outer surface, therefore with a uniform distance between the screen and the outer surface of the face, can also contribute, in some embodiments, to greater uniformity in the transparency in the vicinity of the screen portion.

Thus, in the illustrated embodiment, the inner surface 170 of the concealing element 200 in contact with the perimeter of the screen and the inner surface 140 of the panel are located in the same plane and parallel to the outer surface 110 of the panel.

As shown in FIG. 3A, the junction surface 120 can also comprise, notably in its part closest to the outer surface 110, at least one junction area (122, 126) parallel to the outer surface 110. More specifically, in the illustrated embodiment, the panel comprises a plate 130 near the outer surface (thus, in FIG. 5, the surface of the plate comprises the junction areas 126, 124 and 122 and the outer surface 110). In the illustrated embodiment, the panel also comprises a narrow base 150 (thus, in FIG. 5, the surface of the base comprises the junction area 128 and the inner surface 140), located near the screen portion in the mounting position. Such a "mushroom" shape makes it possible to define two areas, of relatively uniform thickness, one, located vertically relative to the screen portion, with a greater thickness, so as to better conceal the screen portion when the screen is not illuminated, and the other of lesser thickness, so as for example to provide a cost savings.

In the embodiment in FIG. 3A, the junction surface 120 also comprises oblique junction areas 124, 128, forming an acute 182 and/or obtuse angle 182 with the junction areas 122, 126 parallel to the outer surface 110 of the panel. In the illustrated embodiment, the angle 182 formed between the inner surface of the junction area adjacent to the inner surface is about 20 to 55 degrees (for example about 30, 40, 45 or 50°).

The presence of such an angle can make it possible, in some embodiments, to minimise the detectability of the junction surface 120 from the outside, in the mounting position, by softening the transitions between two junction areas, for example between two parallel junction areas. In some embodiments where the housing comprises multiple faces, the angle can also make it possible to make the demarcation line less visible between the panel and the concealing element, from the edge of the front face, in some mounting positions. In the embodiment in FIG. 3A, the base 150 of the panel forms a truncated cone (for example a circular cone or a pyramidal cone) with the inner surface 140 of the panel as its guiding curve (or geometric base). In such an embodiment, the oblique angle formed by the inner surface and the junction area adjacent to the panel (and therefore the "returning" angle relative to the concealing element) can help minimise the bright edge effects appearing on the border between the concealing element and the illuminated screen portion, notably when the housing is viewed from a face other than the front face, to which the panel belongs (therefore with a "side" or lateral view relative to the front face).

In the illustrated embodiment, notably in FIG. 2B, the panel also comprises a rounded edge, so as to prevent the presence of edges between the outer surface 110 of the panel and the adjacent junction surface 122, or at least to make them less visible. In particular, when some parts of moulding drawers are movable, the relative positioning of the drawers can be selected such that the demarcation line created by the drawers is positioned on the junction surface.

Also, the radius of the rounded end can be selected so as to make said junction surface less detectable (notably the first junction area), in the mounting position.

Figure 4A:
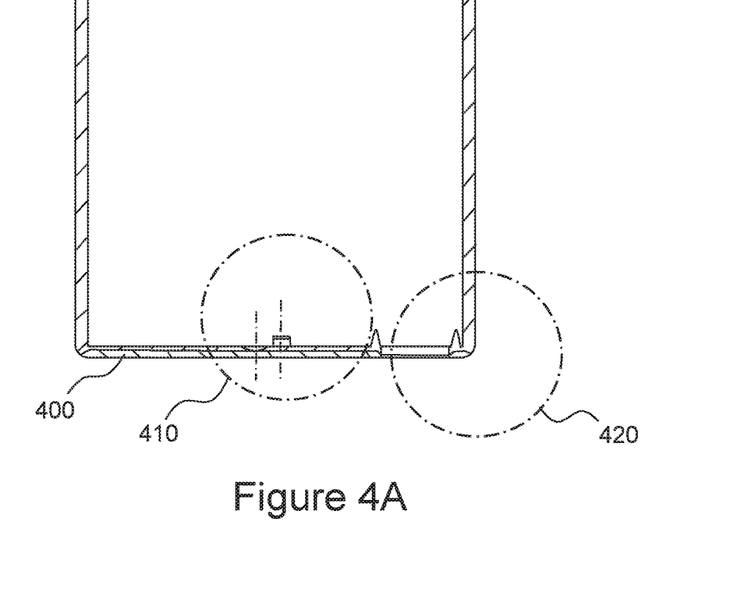
FIG. 4A shows a diagrammatic cross-section view of the front face of the housing of FIG. 1, according to another embodiment, possibly compatible with the embodiment of FIG. 3A.
Figure 4B:
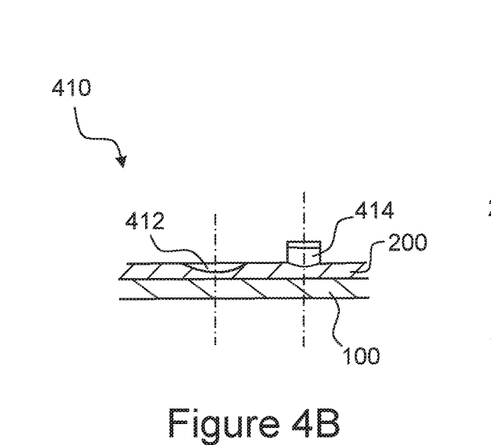
FIG. 4B shows details regarding the front face of the housing, in the cross-section view of FIG. 4A.
Figure 4C:
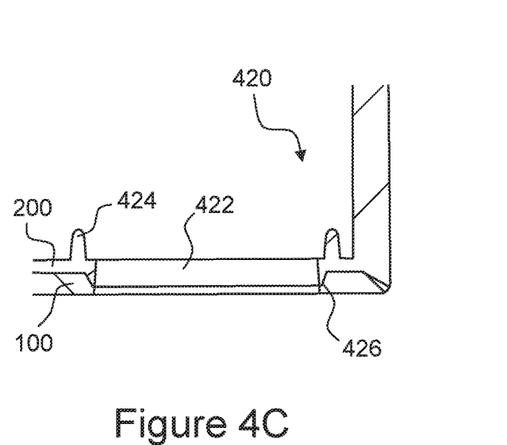
FIG. 4C shows details regarding the front face of the housing, in the cross-section view of FIG. 4A in an embodiment where the front face comprises an arrangement intended to allow infared beams to pass more easily through the concealing element and a positioning module to make it easier to position a visual element on the front face.

Another embodiment will now be presented, with respect to FIGS. 4A to 4C, in which the face comprises an arrangement 410 intended to allow infrared beams to pass more easily through the concealing element. As illustrated in FIGS. 4A and 4B, such an arrangement can comprise a wall thinning (or "recess") 412, that, due to the lesser thickness of the face here, makes it easier for beams to pass through. It can also comprise a through hole 414, which can also be used, in some embodiments, to guide an infrared beam.

In the embodiment in FIGS. 4A and 4C, the face further comprises a positioning module 420 to make it easier to position a visual element, for example a light guide or a coloured element, or a particular graphic, on the face.

Such a positioning module can notably be implanted on a region of the face to which the concealing element belongs, or vertical to the concealing element, so that, when the light intensity and/or the colour of the visual element and/or its graphic are selected such that the visual element is clearly visible in the absence of lighting from the screen, to attract the eye of a user to a region of the outer surface of the face other than the one located opposite the inner surface 140 of the panel 100 (and therefore the screen portion facing the inner surface).

In the particular embodiment illustrated, the positioning module 420 is formed at the time of the moulding of the panel and/or said concealing element. In other embodiments, it can be created after the moulding of the panel and/or the concealing element, notably by piercing or treating the surface of the moulded panel (for example sanding to make it easier to later affix a visual element).

In the particular embodiment illustrated, the creation of the positioning module comprises the formation of an opening 422 passing through both the panel 100 and the concealing element 200, thus forming a light guide, in the mounting position, between a light source inside the device and the outside of the face.

The moulding 420 of the concealing element 200 can particularly comprise the creation of at least one rib 424 on the inner surface of the concealing element, in the vicinity of the through opening 422, so as for example to reduce the leakage of light from a light source, outside the through opening 422.

In the illustrated embodiment, the moulding of the panel and/or the concealing element further comprises an arrangement of a lip 426, on the perimeter of the opening 422, on the junction surface 120. Such a lip can for example make it possible, in some embodiments, to make the walls of the opening less visible from the outside of the device.

In a variant, the positioning module can be pierced and/or moulded in the concealing element, so as to make it possible for example, in some embodiments, to insert a visual element (during the moulding or later) on the junction surface of the panel. Such an embodiment can for example make it possible, in some embodiments, to not detect the visible element by touch.

In the illustrated embodiment, the housing only comprises a unique panel. Of course, a housing can comprise several panels. Depending upon embodiments, those panels can be located on the same face of the housing or on different faces of the housing.

The invention claimed is:

1. A housing to be mounted, in a mounting position, on a body of an electronic device, said housing comprising
    at least one panel intended to cover, in said mounting position, at least one portion, intended to be illuminated, of a display screen of said electronic device, wherein said at least one panel is moulded from a first mixture of at least one base material and at least one opacifying material, said at least one panel having at least one first transparency criterion, and being adapted to conceal said at least one portion of said display screen in said mounting position, in an absence of illumination from said display screen, and to leave, said at least one portion of said display screen visible, through said at least one panel, when said at least one portion of said display screen is illuminated;
    the surface of the at least one panel comprising at least one junction surface with a concealing element adapted to at least partially conceal, in said mounting position, a component of said electronic device, said at least one junction surface comprising a first portion being an oblique portion forming an acute angle with at least one inner surface of said at least one panel, said inner surface being adapted to face, in said mounting position, said at least one portion of said display screen to be illuminated.

2. A housing according to claim 1, wherein said at least one panel is overmoulded with said a-concealing element, said concealing element being moulded from a second mixture comprising at least one second base material and at least one second opacifying material, said second mixture being adapted so that said concealing element meets at least one second transparency criterion, said concealing element being adapted to at least partially conceal, in said mounting position, a component of said electronic device.

3. A housing according to claim 2, wherein said at least first transparency criterion and/or said at least second transparency criterion is defined based on at least one optical parameter value.

4. An apparatus comprising an electronic device comprising
a body on which is mounted, in a mounting position,
a housing, said housing comprising at least one panel designed to cover, in said mounting position, at least one portion of a display screen of said electronic device to be illuminated,
said at least one panel being moulded from a first mixture of at least one base material and at least one opacifying material, said at least one panel meeting at least one first transparency criterion, and being adapted to conceal said at least one portion of said display screen in said mounting position, in an absence of illumination from said display screen and to leave, said at least one portion of said display screen visible, through said at least one panel, when said at least one portion of said display screen is illuminated;
the surface of the at least one panel comprising at least one junction surface with a concealing element adapted to at least partially conceal, in said mounting position, a component of said electronic device, said at least one junction surface comprising a first portion being an oblique portion forming an acute angle with at least one inner surface of said at least one panel, said inner surface being adapted to face, in said mounting position, said at least one portion of said display screen to be illuminated.

5. A method for obtaining at least one panel of a housing to be mounted, in at least one mounting position, on the body of an electronic device, said at least one panel being designed to cover, in said at least one mounting position, at least one portion of said at least one panel, intended to be illuminated, of a display screen of said electronic device, said method comprising
moulding said panel from a first mixture of at least one base material and at least one opacifying material, said first mixture being adapted so that said at least one portion of said at least one panel meets at least one first transparency criterion, conceals said at least one portion of said display screen in said mounting position, in an absence of illumination from said display screen, and leaves said at least one portion of said display screen visible, through said at least one panel, when said at least one portion of said display screen is illuminated;
forming the surface of the at least one panel, said surface of the at least one panel comprising at least one junction surface with a concealing element adapted to at least partially conceal, in said mounting position, a component of said electronic device, said at least one junction surface comprising a first portion being an oblique portion forming an acute angle with at least one inner surface of said at least one panel, said inner surface being adapted to face, in said mounting position, said at least one portion of said display screen to be illuminated.

6. The apparatus according to claim 4, wherein said at least one panel is overmoulded with said concealing element, said concealing element being moulded from a second mixture comprising at least one second base material and at least one second opacifying material, said second mixture being adapted so that said concealing element meets at least one second transparency criterion, said concealing element being adapted to at least partially conceal, in said mounting position, a component of said electronic device.

7. The apparatus according to claim 4,
wherein at least one second portion of said at least one junction surface and/or at least one portion of said at least one inner surface is parallel to at least one part of an outer surface of the at least one panel, said outer surface forming a portion of an outer surface of a face of said housing in said mounting position.

8. The apparatus according to claim 7, wherein said at least one junction surface comprises a first junction area located opposite a periphery of said outer surface of said at least one panel.

9. The apparatus according to claim 7, wherein at least one third portion of said junction surface forms an obtuse angle with said at least one second portion of said at least one junction surface parallel to said outer surface of said at least one panel.

10. The apparatus according to claim 7, wherein said at least one panel occupies an entire outer surface of said face of said housing.

11. The apparatus according to claim 7, wherein said outer surface of said face of said housing has at least one rounded end.

12. An electronic device comprising
a body on which is mounted, in a mounting position,
a housing, said housing comprising at least one panel designed to cover, in said mounting position, at least one portion of a display screen of said electronic device to be illuminated,
said at least one panel being moulded from a first mixture of at least one base material and at least one opacifying material, said at least one panel meeting at least one first transparency criterion, and being adapted to conceal said at least one portion of said display screen in said mounting position, in an absence of illumination from said display screen and to leave, said at least one portion of said display screen visible, through said at least one panel, when said at least one portion of said display screen is illuminated;
the surface of the at least one panel comprising at least one junction surface with a concealing element adapted to at least partially conceal, in said mounting position, a component of said electronic device, said at least one junction surface comprising a first portion being an oblique portion forming an acute angle with at least one inner surface of said at least one panel, said inner surface being adapted to face, in said mounting position, said at least one portion of said display screen to be illuminated.

13. The electronic device according to claim 12, wherein said at least one panel is overmoulded with said concealing element, said concealing element being moulded from a second mixture comprising at least one second base material and at least one second opacifying material, said second mixture being adapted so that said concealing element meets at least one second transparency criterion, said concealing element being adapted to at least partially conceal, in said mounting position, a component of said electronic device.

14. The electronic device according to claim 12, wherein at least one second portion of said at least one junction surface and/or at least one portion of said at least one inner surface is parallel to at least one part of an outer surface of the at least one panel, said outer surface forming a portion of an outer surface of a face of said housing in said mounting position.

15. The electronic device according to claim 12, wherein said at least one junction surface comprises a first junction area located opposite a periphery of said outer surface of said at least one panel.

16. The electronic device according to claim 14, wherein at least one third portion of said junction surface forms an obtuse angle with said at least one second portion of said at least one junction surface parallel to said outer surface of said at least one panel.

17. The electronic device according to claim 14, wherein said at least one panel occupies an entire outer surface of said face of said housing.

18. The electronic device according to claim 14, wherein said outer surface of said face of said housing has at least one rounded end.

19. The electronic device of claim 14 wherein said face comprises a positioning module adapted to receive a visual element adapted to be clearly visible in an absence of illumination of said display screen, said positioning module being implanted in a region of said face of said housing to which said concealing element belongs, or vertical to said concealing element.

* * * * *